Sept. 28, 1943.  G. D. JOHNSON  2,330,493
TAPERED PLUG VALVE
Filed June 12, 1942  3 Sheets-Sheet 1

Inventor
G. D. JOHNSON
By Malcolm F. Gunner
Attorney

Sept. 28, 1943.   G. D. JOHNSON   2,330,493
TAPERED PLUG VALVE
Filed June 12, 1942   3 Sheets-Sheet 2

Inventor
G. D. JOHNSON
By Malcolm F. Gannett
Attorney

Patented Sept. 28, 1943

2,330,493

UNITED STATES PATENT OFFICE 2,330,493

TAPERED PLUG VALVE

George Dugan Johnson, York, Pa., assignor to S. Morgan Smith Company, York, Pa., a corporation of Pennsylvania Application June 12, 1942, Serial No. 446,702

4 Claims. (Cl. 251—101)

This invention relates to valves and more particularly to valves of the type having conical or tapered plugs for controlling the flow of fluid therethrough.

An object of the invention is to provide an improved tapered plug valve, in which the valve plug is provided with means by which forces from the fluid on the high pressure side of the valve plug are utilized to assist the valve operating mechanism to rotate the valve plug.

Another object of the invention is to provide an improved tapered plug valve, in which the valve plug has a vane formed thereon in such a manner that during the turning movement of the valve plug from closed towards open position, the fluid under pressure on the high pressure side of the valve will engage the vane with sufficient force to assist the valve operating mechanism to rotate the valve plug.

Another object of the invention is to provide an improved tapered plug valve, in which means are provided for hydraulically balancing the valve plug.

Another object of the invention is to provide an improved tapered plug valve, in which the inherent closing torque which develops during rotation of the valve plug towards open position is eliminated.

Another object of the invention is to provide an improved tapered plug valve, in which one side of the valve plug is formed with means adapted to create a balancing torque during rotation of the valve plug towards open position.

With the foregoing and other objects and advantages in view, the invention consists in the preferred construction and arrangement of the several parts which will be hereinafter fully described and claimed.

Figure 1:
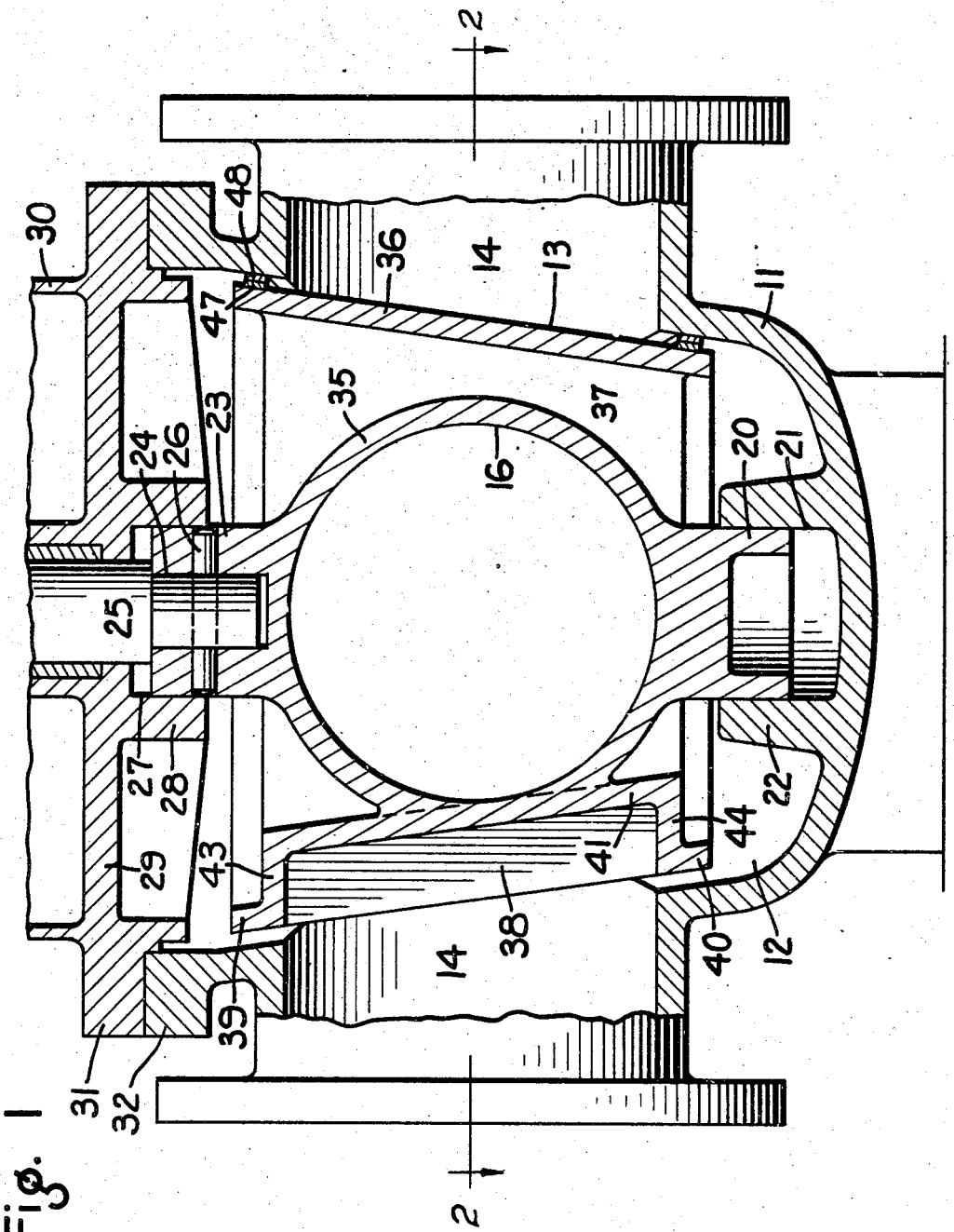
Fig. 1 is a section through a valve embodying the present invention, the plug being shown in closed position.

The present invention relates to tapered plug valves, in which, during the operation of the valve, the conical plug is first unwedged from its seat by moving the plug in a straight line axially. After the plug is unseated it is turned the desired angle to either its open or its closed position. At the completion of the rotary movement, the plug is then moved axially and wedged or reseated. Any suitable mechanism (not shown) may be used for operating the plug, since such mechanism is well known in the art.

Referring to the drawings, the improved valve comprises a main body or casing 11 having a cavity 12 formed therein for a tapered plug 13, the cavity 12 being intersected by a longitudinal waterway or opening 14 which constitutes a passage through the valve. The plug 13 has a passage 16 formed therein of substantially the same diameter as the diameter of the valve passage 14, so that when the plug 13 is in the open position, a uniform bore will extend through the valve from end to end.

The tapered plug 13 is supported for both axial and rotary movement in the valve body 11.

At its inner or smaller end, the plug 13 is formed with an extension which constitutes a trunnion 20 which is mounted in an opening 21 formed in a boss 22 of the valve body 11.

At its outer or larger end, the plug 13 has an extension 23 formed with a bore 24 in which is mounted one end of a shaft 25. The shaft 25 which is operatively connected to the valve operating mechanism (not shown), may be connected to the plug 13 by means of a pin 26.

The extension 23, which constitutes a trunnion, is mounted in an opening 27 formed in a boss 28 depending from the underside of a cover plate or web 29 which encloses the larger end of the valve body 11.

The cover plate or web 29 may be a part of the housing 30 of the valve mechanism.

The housing 30 may be formed with a peripheral flange 31 for engaging a correspondingly formed flange 32 of the valve body 11, so that said housing can be detachably secured to said valve body by means of bolts or the like (not shown), in well known manner.

Figure 2:
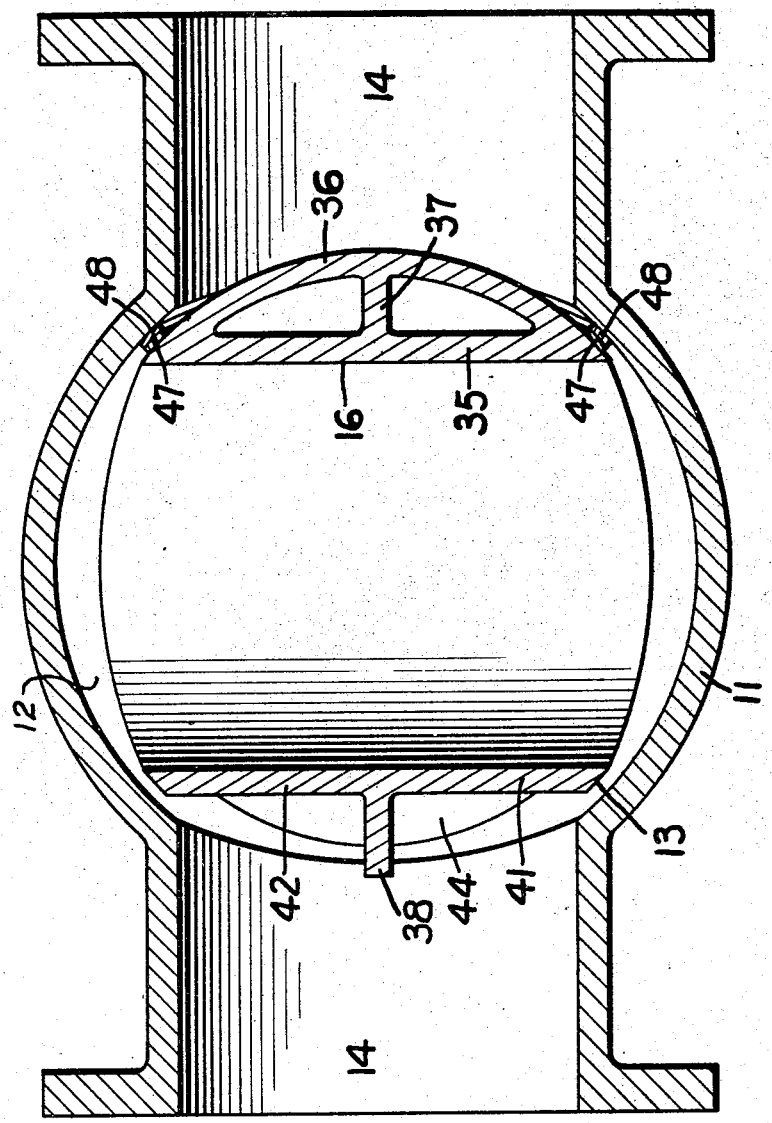
Fig. 2 is a section taken on the line 2—2 of Fig. 1.
Figure 3:
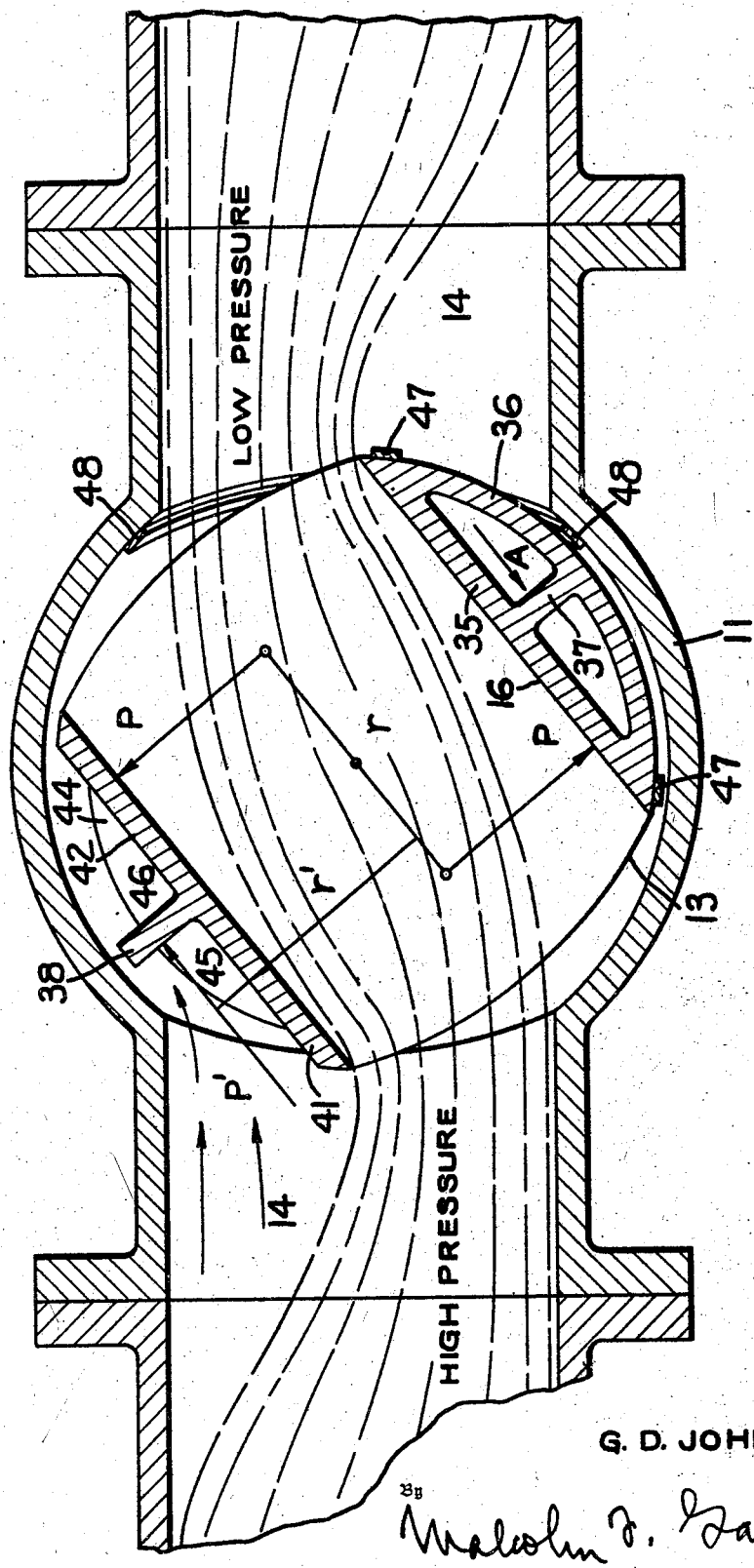
Fig. 3 is a diagrammatic sectional view of the structure shown in Fig. 2, the plug being shown partly open.

In constructing the plug 13, a cylinder 35 is used for forming the waterway 16. The cylinder 35 is arranged in the conical body 36 of the plug with the longitudinal axis of the cylindrical waterway disposed at right angles to the longitudinal axis of the conical body 36. Thus, as shown in Figs. 1, 2 and 3, when the valve plug 13 is disposed in a vertical position, the arrangement of the waterway 16 in said body is such that the cylinder 35 is horizontally disposed with respect to the vertical conical body 36.

Each end of the cylinder 35 is open so that the waterway 16 extends unobstructedly through the valve plug. At each end of the cylinder 35 the wall of the conical body 36 merges with the end of the cylindrical wall. However, intermediate the length of the cylinder 35, its wall is spaced from the conical wall of the body 36 in the manner shown in Figs. 1 and 2. In order to reinforce the body of the valve plug 13, in the case of large valves, it is customary to connect the cylindrical wall 35 with the conical wall 36, by one or more webs 37. In the instant case only a single web 37 is shown (see Figs. 1 and 2). However, it will be understood that as many webs 37 may be employed as is necessary to provide a strong and rigid plug.

The web or rib 37 is shown as being arranged at right angles to the longitudinal center line of the waterway 16, and said web extends vertically of the valve plug body from a point adjacent to the top to a point adjacent to the bottom of said body.

According to the present invention, a portion of the conical wall 36 of the valve plug body 13 is eliminated or omitted, and in lieu thereof the valve plug body is formed with a vane 38.

As shown in Fig. 2, the vane 38 may be diametrically disposed with respect to the web or rib 37, said vane extending, as shown in Fig. 1, between an upper arcuate flanged portion 39 and a lower arcuate flanged portion 40. The flanges 39 and 40 merge with the conical wall 36 and all of these elements encircle the valve plug body in the manner clearly shown in Fig. 1.

The improved construction of the valve plug body also includes a wall composed of two parts, indicated at 41, 42. This wall is disposed substantially in parallel relationship to the inclined angle of the conical wall 36, but said wall 41, 42 is arranged as extensions of one of the side walls of the cylinder 35. In other words, the flat, straight wall 41, 42 is disposed at an angle with respect to the vertical rotative axis of the valve plug. The vane 38 extends outwardly from the wall 41, 42. At the upper end of the valve plug the space between the upper portion of the wall 41, 42 and the arcuate flange 39 is closed by a horizontal wall or web 43. Likewise, the space between the lower arcuate flange 40 and the lower portion of the wall 41, 42, is closed by a horizontal wall or web 44.

The arrangement of the vane 38 and the walls 41, 42, 43 and 44, is such that pockets 45 and 46 are provided at one side of the valve plug for the purpose to be hereinafter more fully described (see Fig. 3.)

In order to provide means for sealing the joint between the valve plug 13 and the valve body 11 when the plug is in closed position, the conical wall 36 of the valve plug is formed with a sealing ring 47 which is adapted to engage with a corresponding ring 48 formed on the wall of the cavity 12 and surrounding the waterway 14 at one end of the valve body 11, as shown in Fig. 1.

In the conventional type of tapered plug valve, when the conical plug is being rotated from closed towards open position, there is set up a hydraulic unbalance resulting from a combination of low pressure to high pressure areas on the surfaces of the waterway, which combination of pressures tends to rotate the valve plug in a closing direction. This unbalance of the pressures must be overcome by the operating mechanism of the valve. Consequently, it is of advantage to decrease the operating torque of a tapered plug valve so that a corresponding decrease can be had in the operating power of the mechanism, with the resultant lower costs of manufacturing such mechanism.

By constructing the valve plug 13, with the vane 38 and associated parts arranged in the manner heretofore described, when the plug 13 is rotated in the direction of the arrow A, Fig. 3, towards open position, high pressure fluid from the conduit on the upstream side of the valve enters the pocket 45, impinges against the vane 38, and acts against the plug so as to balance the rotating effect.

That is to say, when a conventional waterway is used in the valve plug, a torque resulting from the couple of forces P (Fig. 3) exists. To balance this rotating effect, the vane 38 is used, against which vane force P' acts, creating a counterrotating force on the plug acting against the couple.

By making the area of the vane 38, so that the rotating effect $P'r'=2Pr$, the plug will be hydraulically balanced.

In this way, a portion of the pressure of the fluid flowing through the waterway of a tapered plug valve is adapted to act on a surface of the body of the valve plug during rotation of the valve plug towards open position in such a manner as to overcome the inherent closing torque. Thus, the amount of power required of the mechanism for operating the improved valve of the present invention is considerably less than the amount of power required to operate a conventional tapered plug valve.

During the rotation of the valve plug towards open position, fluid leaking from the pocket 45 past the periphery of the vane 38 into pocket 46, will be vented through the space between the valve plug 13 and the wall of the cavity 12 into the low pressure side of the conduit in which the valve is installed. Thus, in actual practice, during operation of the valve plug in the direction of the arrow A, Fig. 3, pocket 45 functions as a high pressure chamber and pocket 46 functions as a low pressure chamber.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having thus described my invention, what I claim is:

1. A plug valve of the type described, comprising a body having a passage therethrough, a conical cavity formed in said body and intersecting said passage, a valve plug rotatably mounted in said cavity, said plug having a waterway therethrough for registration with the passage when the plug is in open position, and a vane projecting outwardly from a side wall of said plug at a substantially right angle to the longitudinal center line of the waterway, said vane being disposed within the confines of the seat provided by the conical wall of said valve body cavity by a sufficient amount to allow a flow clearance between the vane and the seat, whereby the impact of the fluid against the vane which is effective on the plug is due to the change of velocity of the fluid by the vane as the fluid flows through the clearance between the plug and the wall of the cavity during rotation of the plug towards open position in opposition to the pressure present in said waterway which tends to rotate said plug in a closing direction.

2. A plug valve of the type described, comprising a body having a passage therethrough, a cavity formed in said body and intersecting said passage, a seat formed on the wall of said cavity and surrounding the passage opening in said body, a valve plug rotatably mounted in said cavity, said plug having a waterway therethrough for registration with said passage when the plug is in open position, said plug having a seat on one side thereof for registration with said valve body seat to close said passage, and a member formed on the exterior of the side of said plug opposite to the side having said seat, said member being disposed within the confines of the wall of said cavity by a sufficient amount to allow a flow clearance between the member and the cavity wall, whereby the impact of fluid against the member which is effective on the plug is due to the change of velocity of the fluid by the member as the fluid flows through the clearance between the plug and the wall of the cavity during rotation of the plug towards open position in opposition to the pressure present in said waterway which tends to rotate said plug in a closing direction.

3. A plug valve of the type described, comprising a body having a passage therethrough, a cavity formed in said body and intersecting said passage, a plug rotatably mounted in said cavity, said plug having a waterway therethrough for registration with the passage when the plug is in open position, and a vane disposed on the exterior of a side wall of said plug, said vane being arranged within the confines of the seat provided by the wall of said cavity by a sufficient amount to allow a flow clearance between the vane and the seat, whereby the impact of the fluid against the vane which is effective on the plug is due to the change of velocity of the fluid by the vane as the fluid flows through the clearance between the plug and the wall of the cavity during rotation of the plug towards open position in opposition to the pressure present in the waterway which tends to rotate the plug in a closing direction.

4. A plug valve of the type described, comprising a body having a passage therethrough, a cavity formed in said body and intersecting said passage, a valve plug rotatably mounted in said cavity, said plug having a waterway therethrough for registration with the passage when the plug is in open position, and a member projecting outwardly from a side wall of said plug, said member being disposed within the confines of the seat provided by the wall of said cavity by a sufficient amount to allow a flow clearance between the member and the seat, whereby the impact of the fluid against the member which is effective on the plug is due to the change of velocity of the fluid by the member as the fluid flows through the clearance between the plug and the wall of the cavity during rotation of the plug towards open position in opposition to the pressure present in said waterway which tends to rotate the plug in a closing direction.

GEORGE DUGAN JOHNSON.